(12) United States Patent
Merten

(10) Patent No.: US 12,452,318 B2
(45) Date of Patent: Oct. 21, 2025

(54) SYSTEMS AND METHODS FOR TRIGGERING PHONE CALLS TO MOBILE PHONES

(71) Applicant: Gregory Merten, American Fork, UT (US)

(72) Inventor: Gregory Merten, American Fork, UT (US)

( * ) Notice: Subject to any disclaimer, the term of this patent is extended or adjusted under 35 U.S.C. 154(b) by 0 days.

(21) Appl. No.: 17/307,839

(22) Filed: May 4, 2021

(65) Prior Publication Data
US 2021/0352116 A1    Nov. 11, 2021

Related U.S. Application Data

(60) Provisional application No. 63/020,990, filed on May 6, 2020, provisional application No. 63/026,344, filed on May 18, 2020.

(51) Int. Cl.
| | |
|---|---|
| *H04M 3/00* | (2024.01) |
| *H04L 65/1069* | (2022.01) |
| *H04L 65/1073* | (2022.01) |
| *H04M 3/42* | (2006.01) |
| *H04W 4/16* | (2009.01) |
| *H04W 12/06* | (2021.01) |

(52) U.S. Cl.
CPC ...... *H04L 65/1073* (2013.01); *H04L 65/1069* (2013.01); *H04M 3/42034* (2013.01); *H04W 4/16* (2013.01); *H04W 12/06* (2013.01)

(58) Field of Classification Search
CPC ............ H04L 65/1073; H04L 65/1069; H04M 3/42034; H04W 4/16; H04W 12/06
See application file for complete search history.

(56) References Cited

U.S. PATENT DOCUMENTS

| | | | |
|---|---|---|---|
| 7,673,194 B1 | 3/2010 | Sun et al. | |
| 8,483,372 B2 * | 7/2013 | Park | H04L 65/1036 455/414.1 |
| 10,701,067 B1 * | 6/2020 | Ziraknejad | H04W 12/63 |

(Continued)

FOREIGN PATENT DOCUMENTS

CN    101883187 A    11/2010

OTHER PUBLICATIONS

International Search Report and Written Opinion received for PCT Patent Application No. PCT/US21/030775, mailed on Aug. 6, 2021, 2 pages.

(Continued)

*Primary Examiner* — Pakee Fang
(74) *Attorney, Agent, or Firm* — Workman Nydegger

(57) ABSTRACT

An activation device includes a wireless communication interface, an activation circuitry, and a trigger device. The wireless communication interface is configured to communicate with a mobile phone in a personal area network. The activation circuitry is configured to generate a signal for activating the mobile phone. The trigger device is configured to receive an input from a user. When the trigger device receives the input from the user, the activation circuitry is caused to generate the signal, and the wireless communication interface is configured to send the signal to the mobile phone, causing the mobile phone to pass the call request to a call service, which is in turn caused to generate a call, calling the mobile phone.

4 Claims, 17 Drawing Sheets

(56) References Cited

U.S. PATENT DOCUMENTS

| | | | |
|---|---|---|---|
| 10,937,296 B1* | 3/2021 | Kukreja | H04W 12/63 |
| 2002/0197994 A1 | 12/2002 | Harris et al. | |
| 2007/0217584 A1* | 9/2007 | Bi | H04M 1/2471 |
| | | | 379/142.15 |
| 2007/0234892 A1 | 10/2007 | Goldman et al. | |
| 2008/0139228 A1 | 6/2008 | Raffel et al. | |
| 2009/0291663 A1 | 11/2009 | Schultz et al. | |
| 2010/0003944 A1 | 1/2010 | Orr et al. | |
| 2012/0100824 A1 | 4/2012 | Michael | |
| 2013/0344849 A1* | 12/2013 | Chatterjee | H04M 3/42042 |
| | | | 455/415 |
| 2016/0343241 A1* | 11/2016 | Rossi | G08B 29/126 |
| 2017/0251100 A1* | 8/2017 | Keiser | H04M 15/844 |
| 2018/0293523 A1* | 10/2018 | Bergdale | G06Q 20/405 |
| 2019/0370781 A1* | 12/2019 | Van Os | G06Q 20/40 |
| 2021/0352448 A1* | 11/2021 | Powell | H04L 67/306 |
| 2024/0007558 A1* | 1/2024 | Zhang | H04L 12/1818 |

OTHER PUBLICATIONS

Sdongos et al., "Next generation automated emergency calls," IEEE CCNC (gLOBE-IoT, 2017), Las Vegas, Nevada, USA (2017), Jan. 2017 (Jan. 2017) Retrieved on Jul. 3, 2021.

* cited by examiner

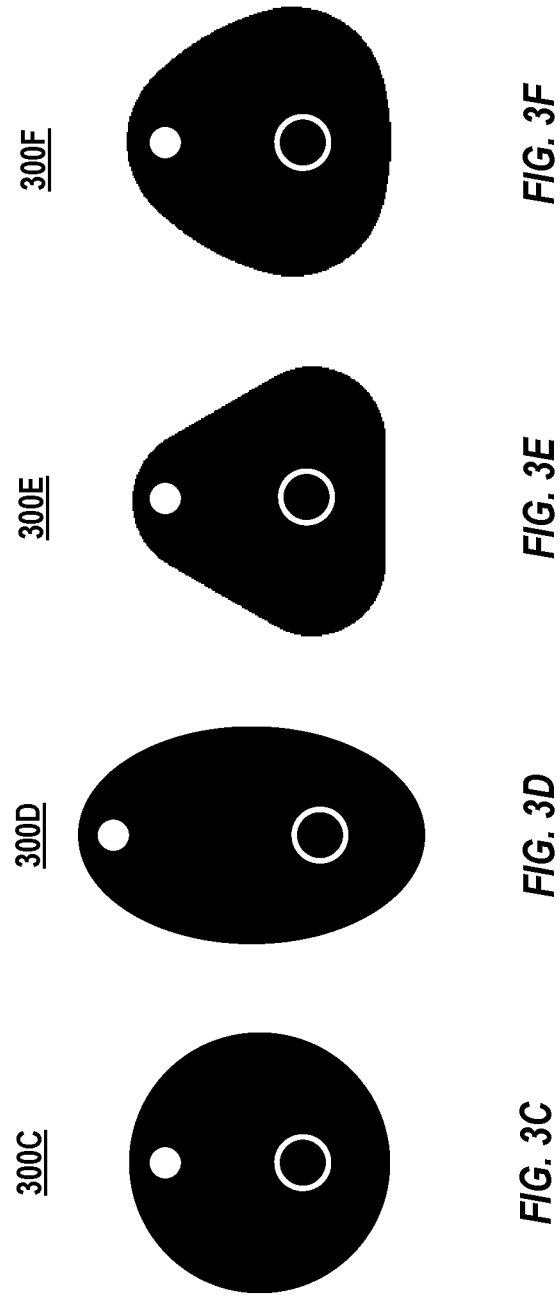

SYSTEMS AND METHODS FOR TRIGGERING PHONE CALLS TO MOBILE PHONES

CROSS-REFERENCE TO RELATED APPLICATION

This application claims the benefit of U.S. Provisional Application No. 63/020,990, filed May 6, 2020, entitled METHOD OF TOOL TO MAKE DISCREET REMOTE PHONE CALLS TO A MOBILE PHONE, the contents of which are herein incorporated by reference in its entirety. This application also claims the benefit of U.S. Provisional Application No. 63/026,344, filed May 18, 2020, entitled SYSTEMS AND METHODS FOR MAKING REMOTE PHONE CALLS TO A MOBILE PHONE, the contents of which are herein incorporated by reference in its entirety.

BACKGROUND

Traditional social life may create awkward situations when individuals look for opportunities to discreetly exit. In some cases, a person may make a prearrangement with a friend or a family member, such that the friend or the family member would call the person's mobile phone at a particular time in the middle of a date. If the date does not go well, the call could create an excuse for the person to step out of the date.

Alternatively, a person may also set an alarm on their mobile phone or use an application that creates an illusion of receiving a phone call. However, when the alarm is set off, the person must engage with the phone to turn off the alarm and then simulate answering a call.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

The embodiments described herein are related to a mobile phone, comprising one or more processors, a first wireless communication interface, a second wireless communication interface, and one or more computer-readable hardware devices. The first wireless communication interface is configured to communicate with an activation device in a personal area network. The activation device has a trigger device configured to receive an input from a user. The second wireless communication interface is configured to communicate with a call service via a local area network or a wide area network. Computer-executable instructions are stored on the one or more computer-readable hardware devices. The computer-executable instructions are structured such that, when executed by one or more processors, the computer-executable instructions configure the computing system to perform various acts. In particular, when the trigger device receives the input from the user, the computing system receives an indication from the activation device via the first communication interface, indicating a call request, requesting a call from the call service. The computing system passes the call request to the call service via the second communication interface, causing the call service to generate a call, calling the mobile phone. Finally, the mobile phone receives the call from the call service.

The embodiments described herein are also related to an activation device, comprising a wireless communication interface, an activation circuitry, and a trigger device. The wireless communication interface is configured to communicate with a mobile phone in a personal area network. The activation circuitry is configured to generate a signal for activating the mobile phone. The trigger device is configured to receive an input from a user. When the trigger device receives the input from the user, the activation circuitry is caused to generate the signal, and the wireless communication interface is configured to send the signal to the mobile phone, causing the mobile phone to pass the call request to a call service, which is in turn caused to generate a call, calling the mobile phone.

The embodiments described herein are also related to a server computing system comprising one or more processors and one or more computer-readable hardware devices having stored thereon computer-executable instructions that are structured such that, when executed by the one or more processors, configure the computing system to perform various acts. In particular, the server computing system is configured to provide an automatic call service to a plurality of user accounts that are registered in a registry. The server computing system is also configured to receive a call request from a mobile phone and verifies whether the mobile phone is associated with one of the user accounts registered in the registry. In response to verifying that the mobile phone is associated with one of the plurality of user accounts, the computing system generates a call, calling a phone number associated with user account.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments, which are illustrated in the appended drawings. Understanding that these drawings depict only typical embodiments and are not, therefore, to be considered to be limiting in scope, embodiments will be described and explained with additional specificity and details through the use of the accompanying drawings in which:

FIGS. 3B-3L illustrate examples of embodiments of key fobs that implement the activation device;

DETAILED DESCRIPTION

Figure 1:
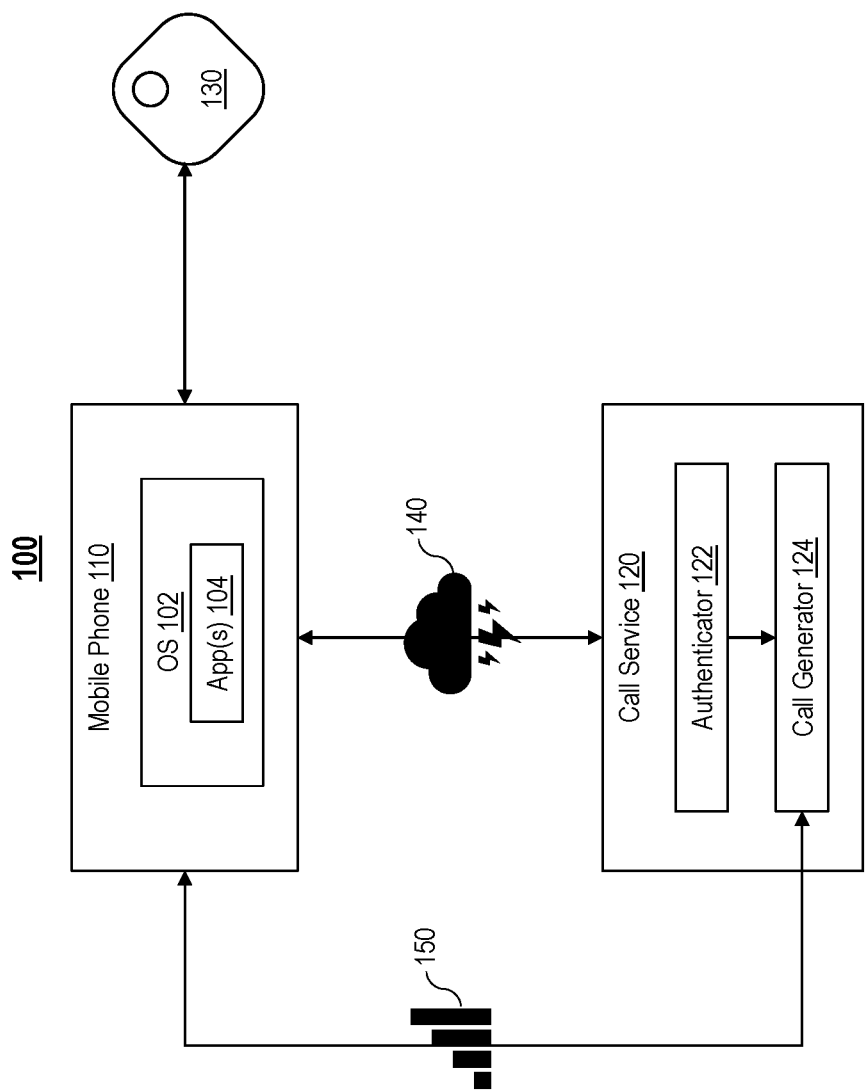
FIG. 1 illustrates an example of an automatic call system configured to receive a user input via an activation device.

The embodiments described herein are related to a system, a method, and an activation device for allowing users to trigger phone calls to mobile phones. FIG. 1 illustrates an example of a system 100, including a mobile phone 110, a call service 120, and an activation device 130. The activation device 130 is connected to the mobile phone via a personal area network (such as Bluetooth low energy connection). The mobile phone 110 has an operating system 102 and one or more applications 104 installed thereon. In some embodiments, one of the one or more applications 104 is configured to send a call request to a call service 120, causing the call service 120 to generate a call, calling the mobile phone 110. The call service 120 includes an authenticator 122 configured to register and authenticate the user of the mobile phone 110 that generates the call request. The call service 120 also includes a call generator 124. In response to successful authentication, the call generator 124 generates a call, calling the mobile phone 110. As illustrated, in some embodiments, the mobile phone 110 is configured to communicate with the call service 120 via a local area network or a wide area network 140 (e.g., Wi-Fi, 3G, or 4G network). The call generator 124 is configured to call the mobile phone 110 via a voice network 150.

Figure 2:
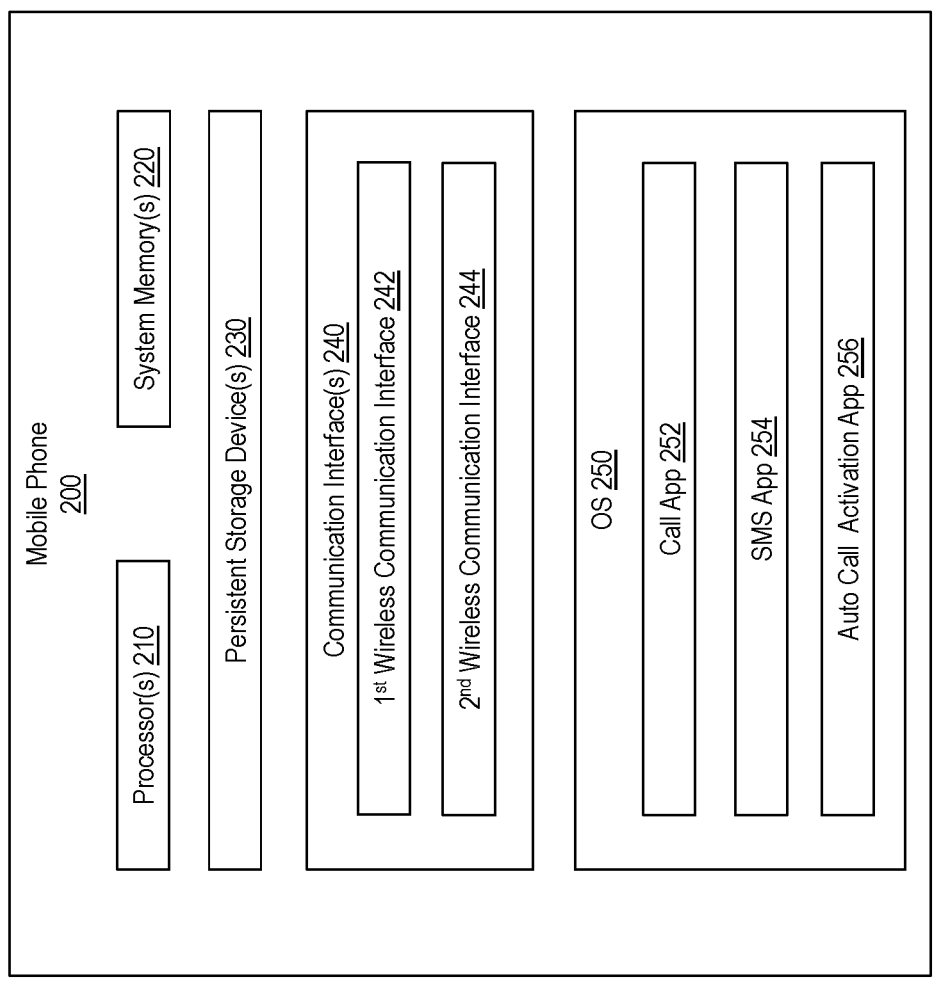
FIG. 2 illustrates an example of an architecture of a mobile phone.

The embodiments described herein are also related to a mobile phone configured to trigger a call from a call service via an activation device. FIG. 2 illustrates an example of an architecture of a mobile phone 200, which corresponds to the mobile phone 110 of FIG. 1. The mobile phone includes one or more processors 210, one or more system memories 220, one or more persistent storage devices 230, and one or more communications interface(s) 240.

The one or more communication interface(s) 240 may include a first wireless communication interface 242, such as (but not limited to) a Bluetooth Low Energy (BLE) interface, a near field communication (NFC) interface, configured to allow the mobile phone 200 to communicate with another device via a personal area network. The one or more communication interface(s) 240 may also include a second wireless communication interface 244, such as (but not limited to) a Wi-Fi interface, a 2G network interface, a 3G network interface, a 4G network interface, a 5G network interface, and/or 6G network interface, configured to allow the mobile phone 200 to communicate with another device via a local area network (LAN) or a wide area network (WAN).

Further, an operating system 250 is installed in the persistent storage devices 230 and loaded in the system memory 220. Additionally, one or more applications may also be installed in the persistent storage devices 230 and loaded in the system memory 220. In some embodiments, the one or more applications installed at the mobile phone 200 include a call application 252 configured to allow users to call other phone numbers, a short message service application 254 configured to allow users to send text messages to other phone numbers, and an auto call activation application 256 configured to trigger a call service (e.g., the call service 120) to generate a call, calling a phone number associated with the mobile phone 200.

In some embodiments, the mobile phone 200 is further configured to pair the activation device 300 via the first wireless communication interface, such that when the trigger device 330 of the activation device 300 receives a user input, the mobile phone 200 is configured to receive the indication from the activation device.

Figure 3A:
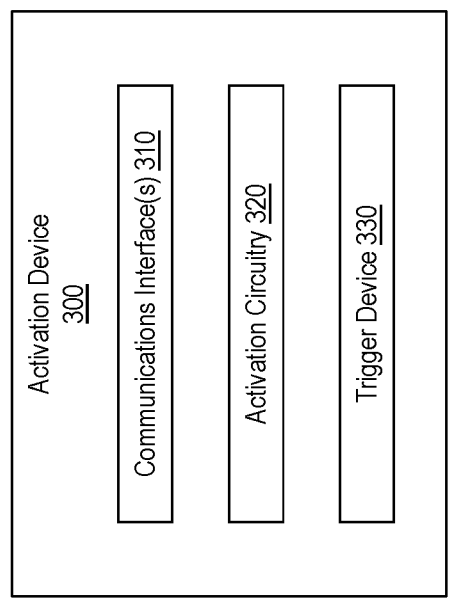
FIG. 3A illustrates an example of an architecture of an activation device.

FIG. 3A illustrates an example of an architecture of an activation device 300, which corresponds to the activation device 130 of FIG. 1. The activation device 300 includes one or more communications interfaces 310, an activation circuitry 320, and a trigger device 330. The one or more communication interfaces 310 includes a wireless communication interface configured to communicate with the mobile phone 200 in a personal area network. The activation circuitry 320 is configured to generate a signal for activating the mobile phone 200. The trigger device 330 is configured to receive an input from a user. When the trigger device 330 receives the input from the user, the activation circuitry 320 is caused to generate the signal, and the wireless communication interface 310 is configured to send the signal to the mobile phone 200, causing the mobile phone to pass the call request to the call service 120, which is in turn caused to generate a call, calling the mobile phone 200.

As briefly discussed above, in some embodiments, the activation device may first be required to be paired with the mobile phone 200 via the first wireless communication interface 242. When the activation device 300 is paired with the mobile phone 200, the activation device 300 is configured to send the signal to the mobile phone 200 via a personal area network (such as a BLE network). The trigger device 330 is configured to receive an input from a user. In some embodiments, the trigger device receives the input from the user, the trigger device generates a haptic feedback, but without an audible sound, such that a user can trigger a phone call discreetly. In some embodiments, the trigger device is a quiet button or a quiet switch. In some embodiments, the activation device is shaped as a key fob.

Figure 3B:
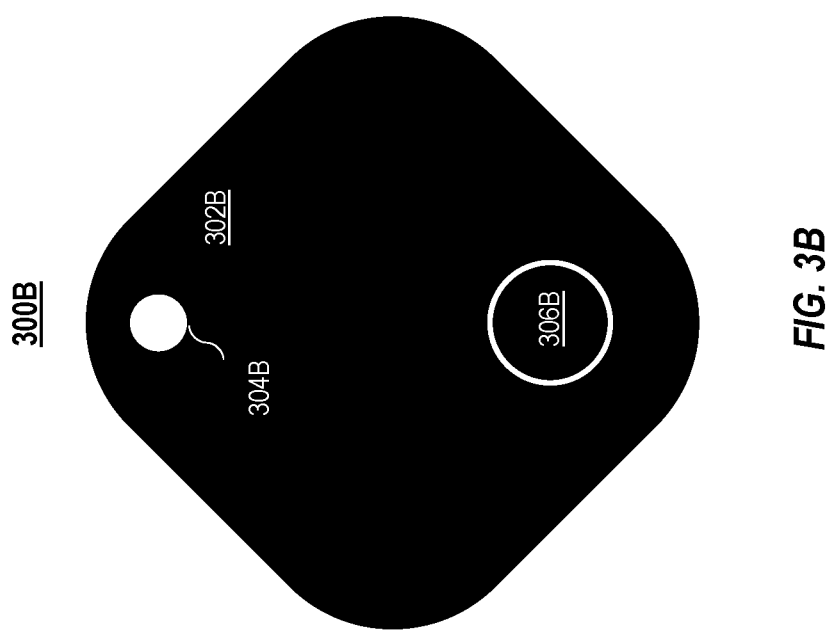

FIGS. 3B-3L illustrate various examples of embodiments of key fobs 300B-300L that are configured as the activation device 300. FIG. 3B illustrates a key fob 300B includes round-cornered square body 302B, in which there is a through-hole 304B configured to be connected to a keychain, lanyard, and/or any other compatible connectors. The key fob 300B also includes a quiet button 306B that serves as a trigger device 330 configured to receive a user input. The quiet button 306B is configured to be quiet when it is being pressed, such that the pressing of the button 306B can be performed discreetly. In some embodiments, the key fob 300B is configured to generate a haptic feedback without any audible sound when the button 306B is pressed. For example, the key fob 300B may also include a vibration device. When the button 306B is pressed, the vibration device is configured to cause the key fob 300B to silently vibrate.

Figure 3I:
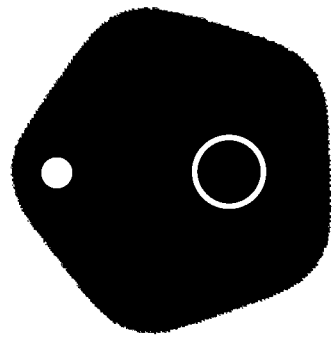
Figure 3L:
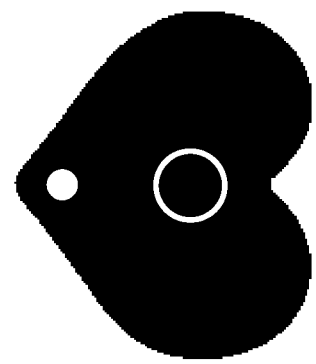
Figure 3H:
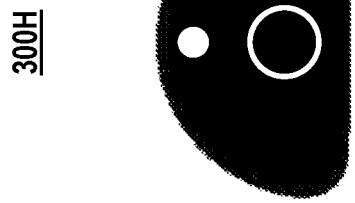
Figure 3K:
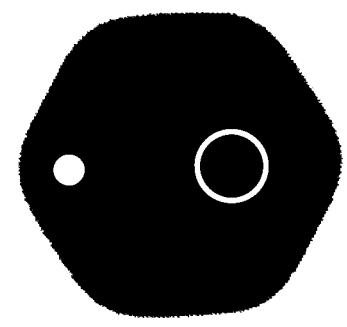
Figure 3G:
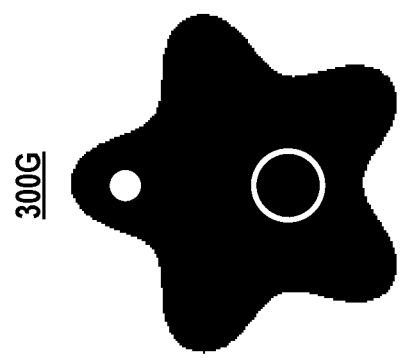
Figure 3J:
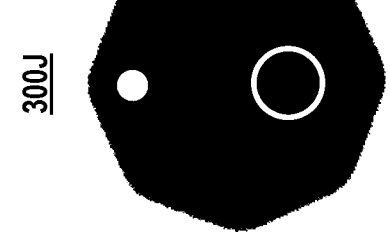

Notably, a round-cornered square is merely one example of a shape that may be implemented at the activation device 300. FIGS. 3C-3L further illustrate additional examples of shapes that may be implemented at the activation device 300. FIG. 3C illustrates a circular-shaped activation device 300C. FIG. 3D illustrates an oval-shaped activation device 300D. FIGS. 3E and 3F illustrate round-cornered triangular-shaped activation devices 300E and 300F. FIG. 3G illustrates a round-cornered star-shaped activation device 300G. FIG. 3H illustrates a round-cornered crescent-shaped activation device 300H. FIG. 3I illustrates a round-cornered pentagon-shaped activation device 300I. FIG. 3J illustrates a round-cornered octagon-shaped activation device 300J. FIG. 3K illustrates a round-cornered hexagon-shaped activation device 300K. FIG. 3L illustrates a hard-shaped activation device 300L.

The above-described shapes are merely a few examples that may be implemented. Any other symmetric or asymmetric geometric shapes or irregular shapes may be implemented at the activation device 300 too. Further, the activation device 300 may also be implemented at any size, texture, and/or color based on users' desire and/or be implemented at any other object other than key fobs. Such objects include (but are not limited to) a pen, a wristband, a watch, a necklace, or a wallet.

In some embodiments, the activation device 300 may include a removable battery and a mechanism to open the unit for maintenance and battery replacement. In some embodiments, the activation device 300 may include a rechargeable battery and a charging port configured to allow the user to charge the battery via a USB cable. In some embodiments, the activation device 300 may also include a wireless charging mechanism that can be charged via a wireless charging pad. In some embodiments, the activation device 300 may also include a solar panel configured to charge the battery via sunlight. In some embodiments, the activation device 300 may be constructed to be waterproof via a variety of mechanisms, including (but not limited to) coatings, gaskets, etc.

Figure 4A:
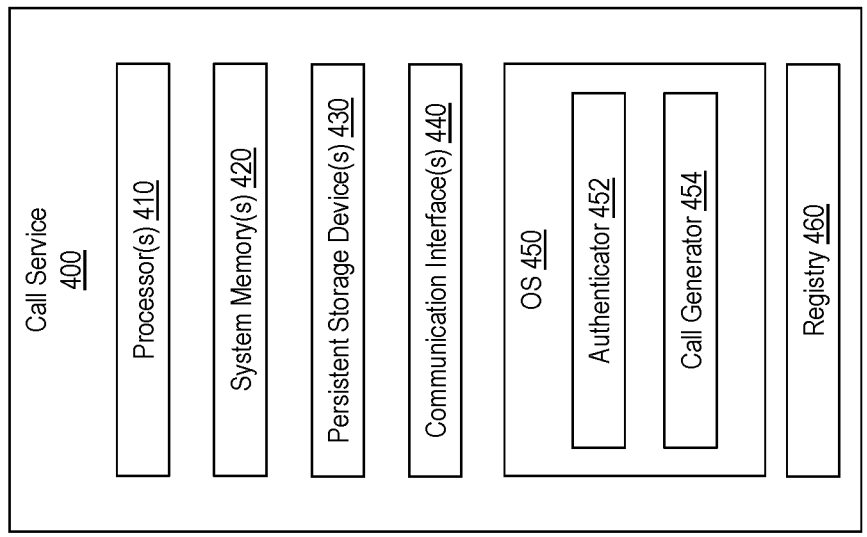
FIG. 4A illustrates an example of an architecture of a call service.

FIG. 4A illustrates an example of an architecture of a call service 400, which corresponds to the call service 120 of FIG. 1. In some embodiments, the call service 400 includes one or more processors 410, one or more system memories 420, one or more persistent storage devices 430, and one or more communication interfaces 440. In some embodiments, an operating system 450 is installed in the one or more persistent storage devices 430 and/or loaded in the system memory 420.

Further, the call service 400 also includes an authenticator 452 and a call generator 454 configured to provide an automatic call service to a plurality of user accounts. The authenticator 452 is configured to register and authenticate a user of a mobile phone 200 when a call request is received from the mobile phone 200. In response to successful authentication, the call generator 454 is configured to generate a call, calling a phone number associated with the user account, which should be the phone number associated with the mobile phone. In some embodiments, the authenticator 452 and the call generator 454 are two separate servers. For example, in some embodiments, the authenticator 452 may be a general authentication service that is configured to provide authentication services to many different applications; and the call generator 454 is a separate application service that utilizes the general authentication service provided by the authenticator 452 to authenticate users registered with the call service 400. Alternatively, the authenticator 452 and the call generator 454 may be an integrated service that performs both authentication functions and call generating functions.

In some embodiments, the call service 400 also includes a registry 460 that records all the mobile phones that are registered with the call service. The authenticator 452 verifies whether a call request is initiated from a user that has been registered in the registry 460. In response to determining that the mobile phone has been registered in the registry 460, the authenticator 452 passes the call request to the call generator 454, causing the call generator 454 to generate the call.

In some embodiments, the call is generated after a period of time after receiving the request from the mobile phone 200. The delay effect may be achieved via the mobile phone 200, the activation device 300, and/or the call service 400. For example, in some embodiments, when the mobile phone 200 receives a call request signal from the activation device 300, the mobile phone 200 may be set to wait for a predetermined period of time before passing the request to the call service 400. Alternatively, in some embodiments, when the user interacts with the trigger device 330 of the activation device 300, the activation device 300 may be set to wait for a predetermined period of time before sending a call request signal to the mobile phone 200.

Alternatively, in some embodiments, then the call service 400 receives a call request from the mobile phone 200, the call service 400 may be set to wait for a predetermined period of time before generating a call. In some embodiments, each of the plurality of user accounts may register a predetermined period of time in the registry 460. In response to verifying that the mobile phone is associated with one of the plurality of user accounts, the call service 400 is configured to wait for the predetermined period of time before generating the call.

In some embodiments, each of the plurality of user accounts also registers an audio file in the registry. In response to verifying that the mobile phone 200 is associated with one of the user accounts, the call service 400 is configured to retrieve the audio file corresponding to the mobile phone 200 and play the audio file when the call is answered by the mobile phone 200.

In some embodiments, the call service 400 is further configured to receive a user indication from the mobile phone 200, indicating a selection of one of a plurality of prerecorded audio files, and associate the selected prerecorded audio file with the user account in the registry 460. In some embodiments, the call service 400 is further configured to receive an audio file from the mobile phone 200 and associate the received audio file with the mobile phone 200 in the registry.

In some embodiments, the call service 400 is configured to receive the call request from the auto call activation app 256 installed at the mobile phone 200 via an internet connection. In some embodiments, the call service 400 is configured to receive the call request from the mobile phone 200 via short message service (SMS). In some embodiments, the call service 400 is configured to receive the call request from the mobile phone 200 via a call, calling a phone number associated with the call service 400.

In some embodiments, the mobile phone 200 is configured to receive a user indication at a user interface for registering the mobile phone 200 in the registry 460 of the call service, such that when the call service 400 receives the call request, the call service 400 verifies that the mobile phone is registered in the registry before generating the call. In some embodiments, the mobile phone 200 and the call service 400 are further configured to perform a multi-factor verification during the registration of the mobile phone 200 with the registry 460. During the multi-factor verification, in some embodiments, the call service 400 is configured to send a verification code via a text message to the phone number associated with the mobile phone 200, and the user is required to submit the verification code via the user interface for registering the mobile phone 200. The user interface may be a user interface of the auto call activation app 256. Alternatively, the call service 400 may be configured to call the phone number associated with the mobile phone 200, and the user is required to answer the call and press a particular key during the call to register the mobile phone 200.

Figure 4B:
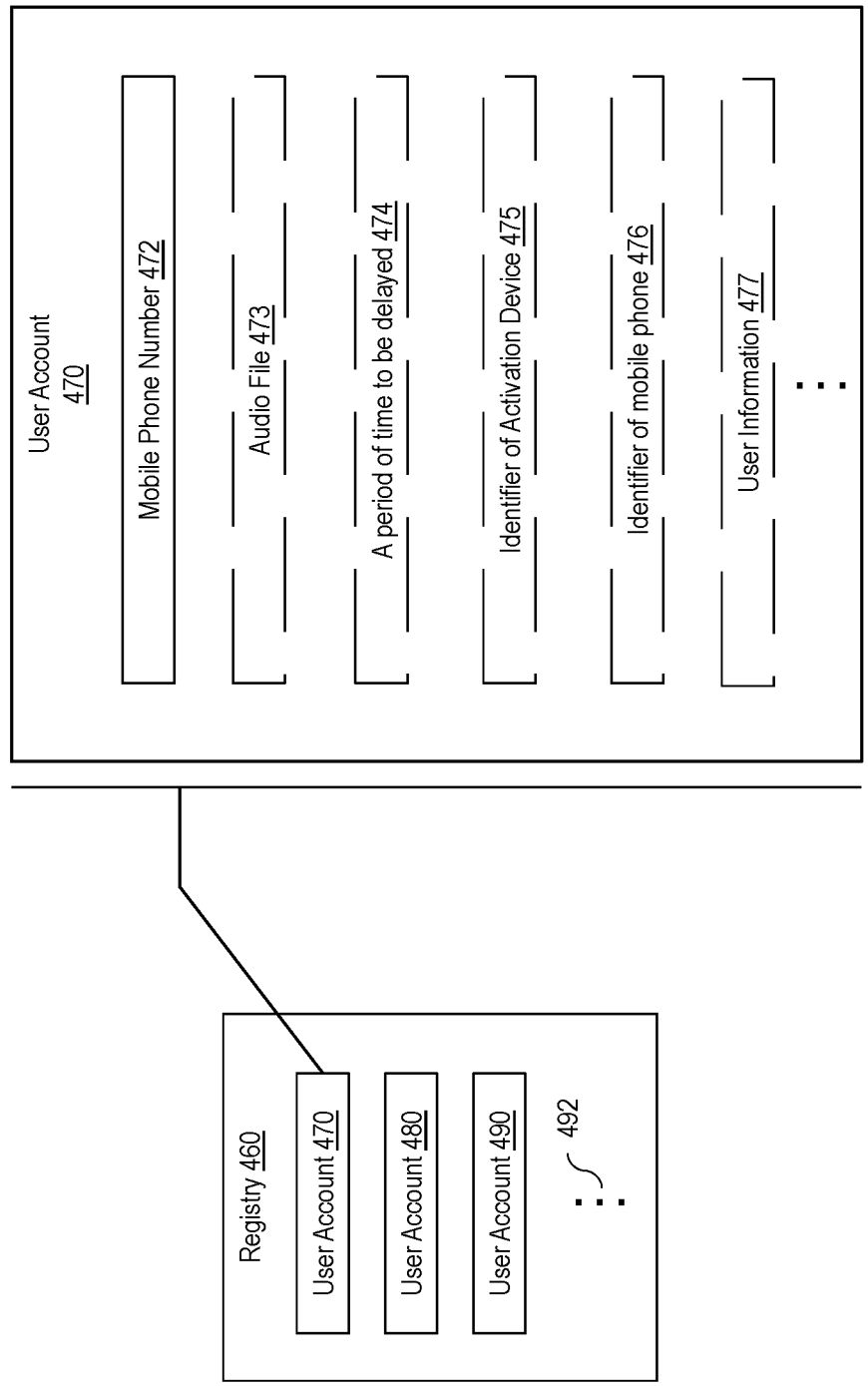
FIG. 4B illustrates an example of a registry stored at the call service of FIG. 4A.

FIG. 4B further illustrates an example of a data structure of the registry 460. The registry 460 records information associated with a plurality of user accounts 470, 480, 490. The ellipsis 492 represents that there may be any number of user accounts registered at the registry 460. Each user account 470 includes at least a mobile phone number 472 that is associated with the user account 470. When a call request is received by the call service 400, the call service 400 verifies that the mobile phone 200 that has generated the call request is associated with the user account 470. In response to a successful verification, the call service 400 generates a call, calling the mobile phone number 472 associated with the user account 470.

In some embodiments, each user account also includes an audio file 473 that is to be played when the call generated by the call service 400 is answered by the user. In some embodiments, a user can select an audio file among a plurality of prerecorded audio files. The selected audio file will be associated with the user account. Alternatively, or in addition, a user can generate a new audio file and associate the new audio file with the user account 470.

In some embodiments, each user account also includes a period of time to be delayed. When a call request is received by the call service 400, the call service 400 verifies that the mobile phone 200 that has generated the call request is associated with a user account 470. In response to a successful verification, the call service 400 retrieves the user account information, including a period of time to be delayed 474, and generates a call after the period of time 474 set in the user account.

In some embodiments, the user account 470 further stores additional user information 477 and/or device information, such as (but not limited to) an identifier of the activation device 475 that is paired with the mobile phone 200, an identifier of the mobile phone 476 (e.g., MAC address, IMEI, etc.). User information 477 may include the user's email address, name, mailing address, and other personal information.

Figure 5:
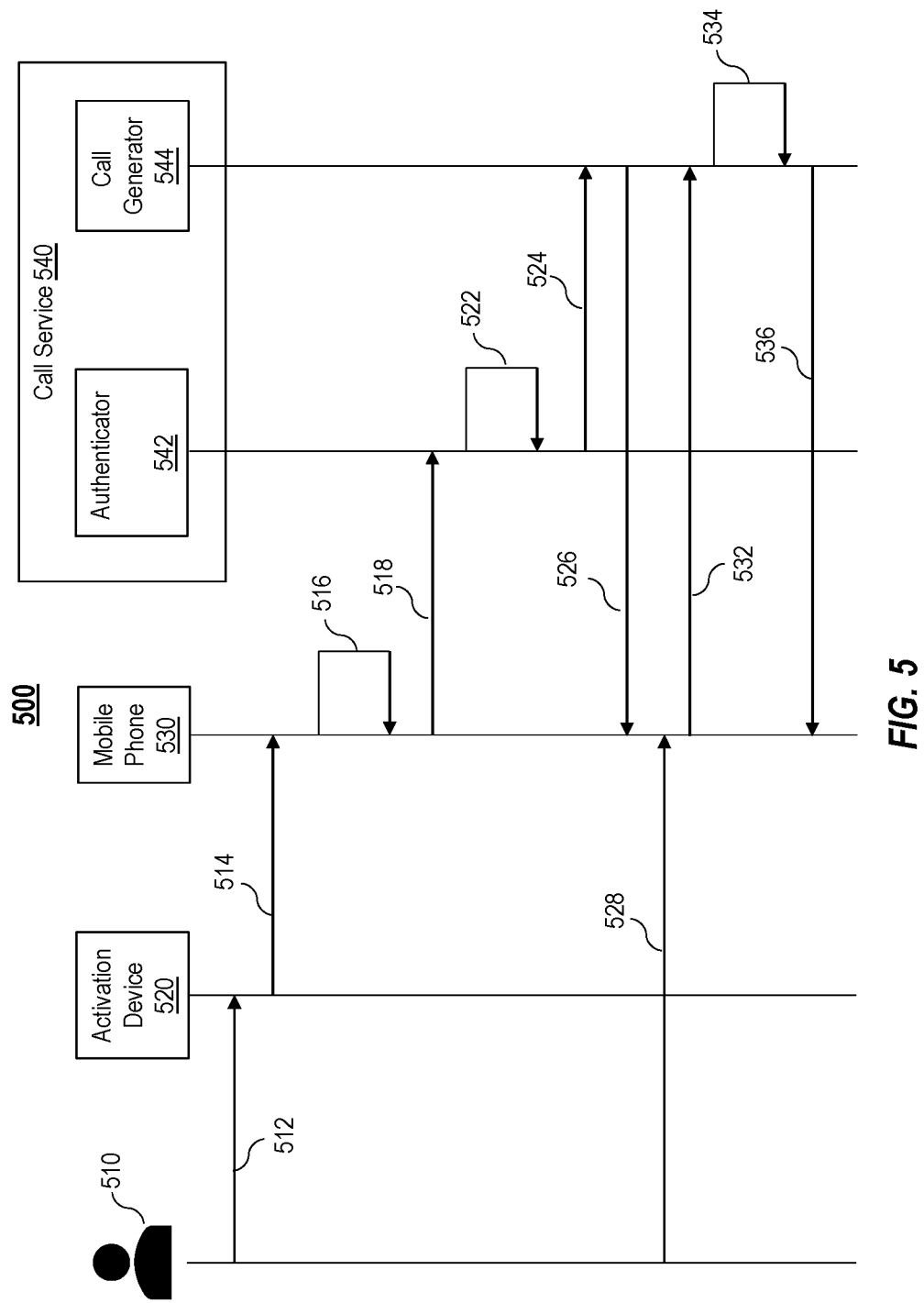
FIG. 5 illustrates an example of a communication pattern among an activation device, a mobile phone, and a call service having an authenticator and a call generator.

FIG. 5 illustrates an example of a communication pattern 500 that may occur among an activation device 520 (which corresponds to the activation device 300 of FIG. 3A), a mobile phone 530 (which corresponds to the mobile phone 200 of FIG. 2), and a call service 540 (which corresponds to the call service 400 of FIG. 4A). The call service 540 includes an authenticator 542 (which corresponds to the authenticator 452 of FIG. 4A), and a call generator 544 (which corresponds to the call generator 454 of FIG. 4A).

As illustrated in FIG. 5, when a user 510 interacts with a trigger device of the activation device 520 (represented by arrow 512), the activation device 520 generates and sends a signal to the mobile phone 530 (represented by arrow 514). The signal indicates a call request. Receiving the signal from the activation device 520, the mobile phone 530 activates a mobile application, which corresponds to the auto call activation application 256 of FIG. 2 (represented by arrow 516). The mobile application at the mobile phone 530 then passes the call request to an authenticator 542 (represented by arrow 518). The call request includes an account identifier that is previously registered with the call service 540. Receiving the call request, the authenticator 542 verifies that the identifier or the call request is associated with a user account that is registered in a registry, which corresponds to the registry 460 of FIGS. 4A and 4B, (represented by arrow 522). In response to successful authentication, the authenticator 542 contacts the call generator 544, requesting the call generator 544 to generate a call (represented by arrow 524). Receiving the request, the call generator 544 generates a call, calling the mobile phone 530 (represented by arrow 526).

When the mobile phone 530 receives the call generated by the call generator 544, the mobile phone will ring, and the user 510 can then answer the call (represented by arrow 528). When the user answers the call, the mobile phone 530 establishes a communication with the call generator 544 (represented by arrow 532). Next, the call generator 544 retrieves an audio file that is associated with the user account (represented by arrow 534) and causes the audio file to be played to the mobile phone 530 (represented by arrow 536).

The following discussion now refers to a number of methods and method acts that may be performed. Although the method acts may be discussed in a certain order or illustrated in a flow chart as occurring in a particular order, no particular ordering is required unless specifically stated or required because an act is dependent on another act being completed prior to the act being performed.

Figure 6:
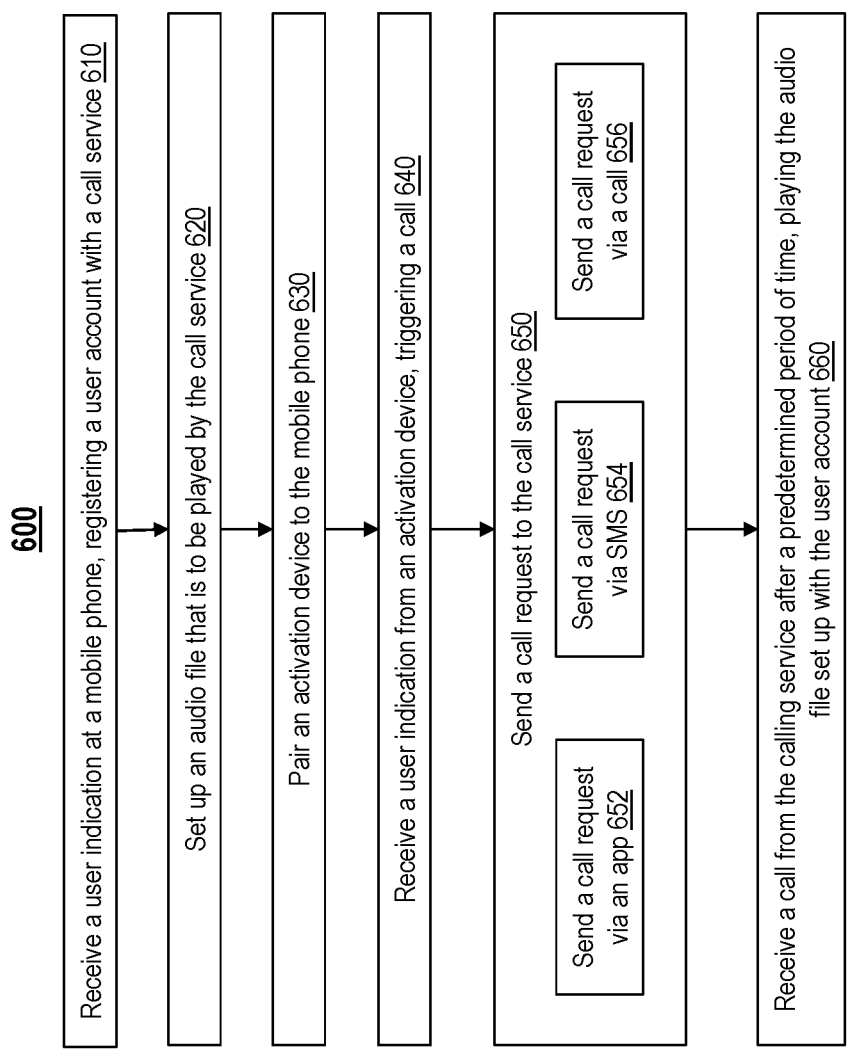
FIG. 6 illustrates a flowchart of an example of a method for using an activation device to trigger a call from a call service to call a mobile phone.

FIG. 6 illustrates a flowchart of an example of a method 600 for allowing an activation device to trigger a call from a call service to call a mobile phone. The method 600 may be performed at or by a mobile phone (e.g., mobile phone 200 of FIG. 2). The method 600 includes receiving a user indication at a mobile phone, registering a user account with a call service, which corresponds to the call service 400 of FIG. 4A (act 610). The method 600 also includes setting up an audio file that is to be played by the call service when a call is generated by the call service (act 620). The method 600 also includes pairing an activation device with the mobile phone (act 630). In response to receiving a user indication from an activation device, triggering a call (act 640), the mobile phone sends a call request to the call service (act 650). In some embodiments, the call request is sent via a mobile application (act 652). In some embodiments, the call request is sent via an SMS to a phone number associated with the call service (act 654). In some embodiments, the call request is sent via a call, calling a phone number associated with the call service (act 656). After the call request is sent to the call service, the mobile phone receives a call from the call service after a predetermined period of time (act 660). When the call is answered at the mobile phone, the call service is caused to play the audio file set up for the user account.

Figure 7:
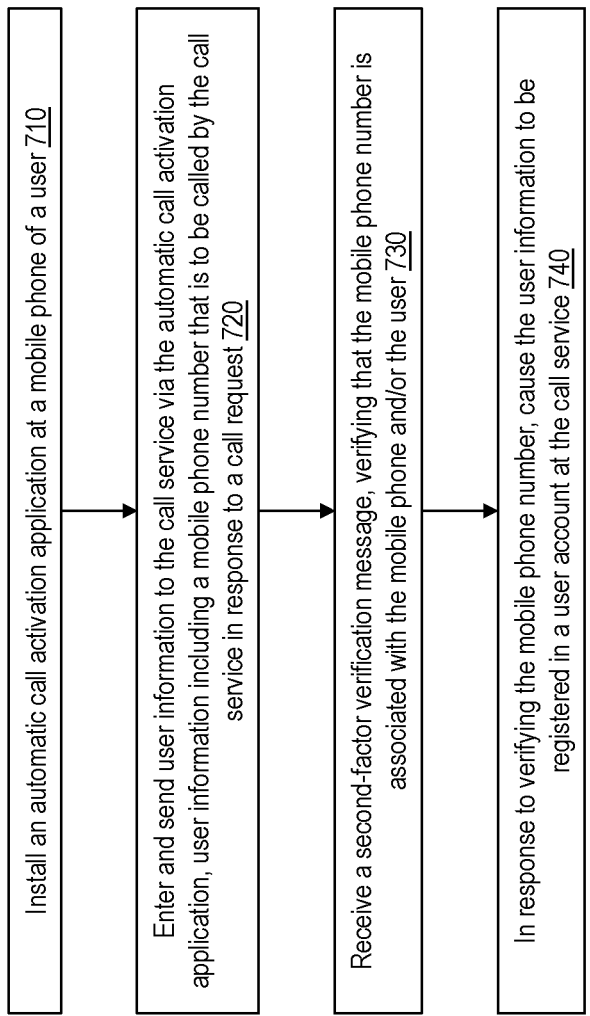
FIG. 7 illustrates a flowchart of an example of a method for registering a mobile phone with a call service.

FIG. 7 illustrates a flowchart of an example of a method 700 for registering a mobile phone with a call service, which corresponds to the act 610 of FIG. 6. The method 700 includes installing an automatic call activation application at a mobile phone of a user (act 710). The automatic call activation application is a user agent of a call service (e.g., call service 400). When the automatic call activation application is installed at the mobile phone, the automatic call activation application allows the user to register an account and/or login to an existing account of the call service. The method 700 also includes entering and sending user information to the call service via the automatic call activation application (act 720). The user information may include (but are not limited to) a mobile phone number that is to be called by the call service in response to a call request. The method 700 further includes receiving a second-factor (or multi-factor) verification message, verifying that the mobile phone number entered by the user is associated with the mobile phone and/or the user (act 730).

The second-factor verification message may be received via an SMS, or a voice call from the call service. For example, when the verification message is an SMS, the SMS may include a verification code, and the user may be required to enter the verification code at a user interface of the automatic call activation application within a time frame to prove that the user is the owner of the mobile phone number. As another example, when the verification is a voice call, the user may be required to answer the call and press a particular key to consent to the phone calls that may be generated in the future. Alternatively, a verification code may be read aloud to the user via the voice call, and the user is required to enter the verification code at the user interface of the automatic call activation application.

In response to verifying that the mobile phone number entered by the user is owned by the user and/or is associated with the mobile phone that installed the automatic call activation application, the user information (including the mobile phone number) is caused to be registered in a user account at the call service (act 740).

Figure 8:
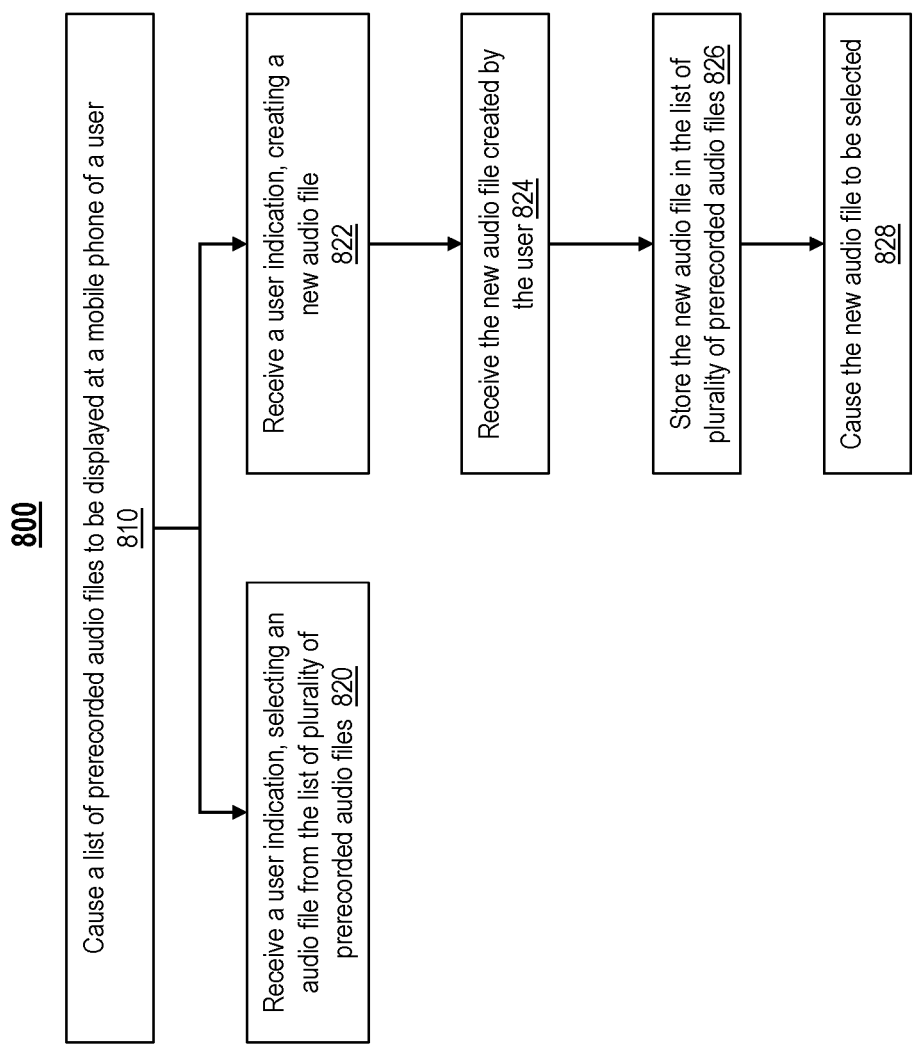
FIG. 8 illustrates a flowchart of an example of a method for selecting an audio file for a call service to play when a call is triggered.

FIG. 8 illustrates a flowchart of an example of a method 800 for receiving a user selection of an audio file for a call service to play when a call is triggered. The method 800 may be performed at or by the call service 400. The method 800 includes causing a list of prerecorded audio files to be displayed at a mobile phone of a user (act 810). The method 800 further includes receiving a user indication, selecting an audio file from the list of the plurality of prerecorded audio files (act 820). Alternatively, the call service may receive a user indication, creating a new audio file (act 822) and receiving the new audio file created by the user (act 824). In response to receiving the new audio file, the call service stores the new audio file in the list of the plurality of prerecorded audio files (act 826) and causes the new audio file to be selected (act 828).

Figure 9:
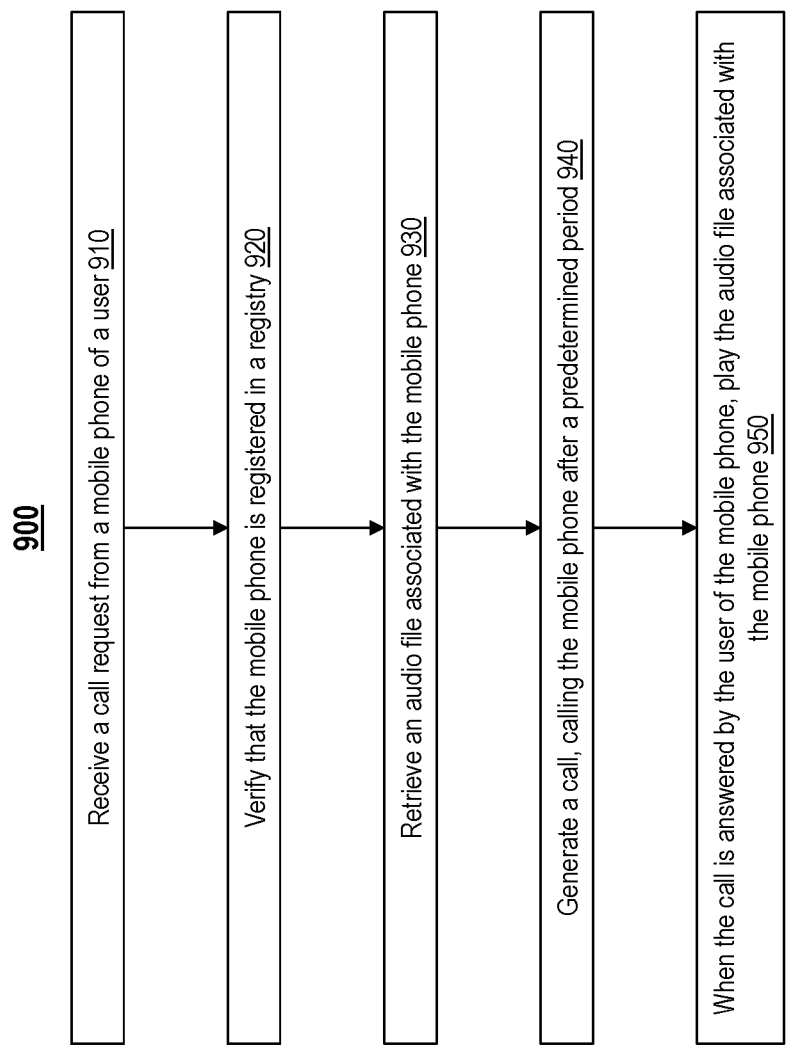
FIG. 9 illustrates a flowchart of an example of a method for generating a call, calling a mobile phone in response to a call request.

FIG. 9 illustrates a flowchart of an example of a method 900 for generating a call, calling a mobile phone in response to a call request, which is performed by the call service (e.g., call service 400 of FIG. 4A). The method 900 includes receiving a call request from a mobile phone of a user (act 910) and verifying that the mobile phone is registered in a registry (act 920). In response to verifying that the mobile phone is registered in the registry, an audio file associated with the mobile phone is retrieved (act 930), and a call is generated, calling the mobile phone after a predetermined period (act 940). When the call is answered by the user of the mobile phone, the audio file associated with the mobile phone is played (act 950).

Figure 10:
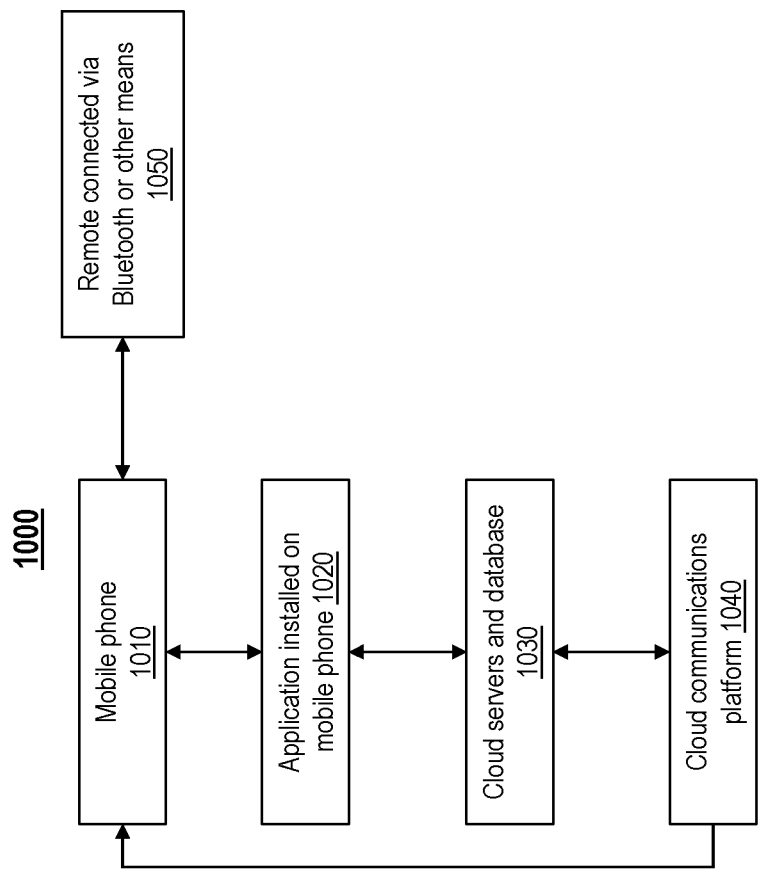
FIG. 10 illustrates an example of a call system including a mobile phone, a remote (i.e., an activation device), cloud servers and database (i.e., an authenticator), and a cloud communications platform (i.e., a call generator)

FIG. 10 illustrates another example of an automatic call system 1000, including a mobile phone 1010, a remote 1050 (i.e., an activation device) connected via Bluetooth or other means, an application installed on the mobile phone 1020, cloud servers and database 1030 (i.e., authenticator 452 of FIG. 4A), and a cloud communications platform 1040 (i.e., call generator 454 of FIG. 4A). The mobile phone 1010 is configured to communicate with the remote 1050 via Bluetooth or other means. When the remote 1050 is activated by a user, the application installed on the mobile phone 1020 is configured to communicate with the cloud servers and database 1030, which in turn is configured to communicate with a cloud communications platform 1040. The cloud communications platform 1040 is then triggered to generate a call, calling the mobile phone 1010.

Figure 11:
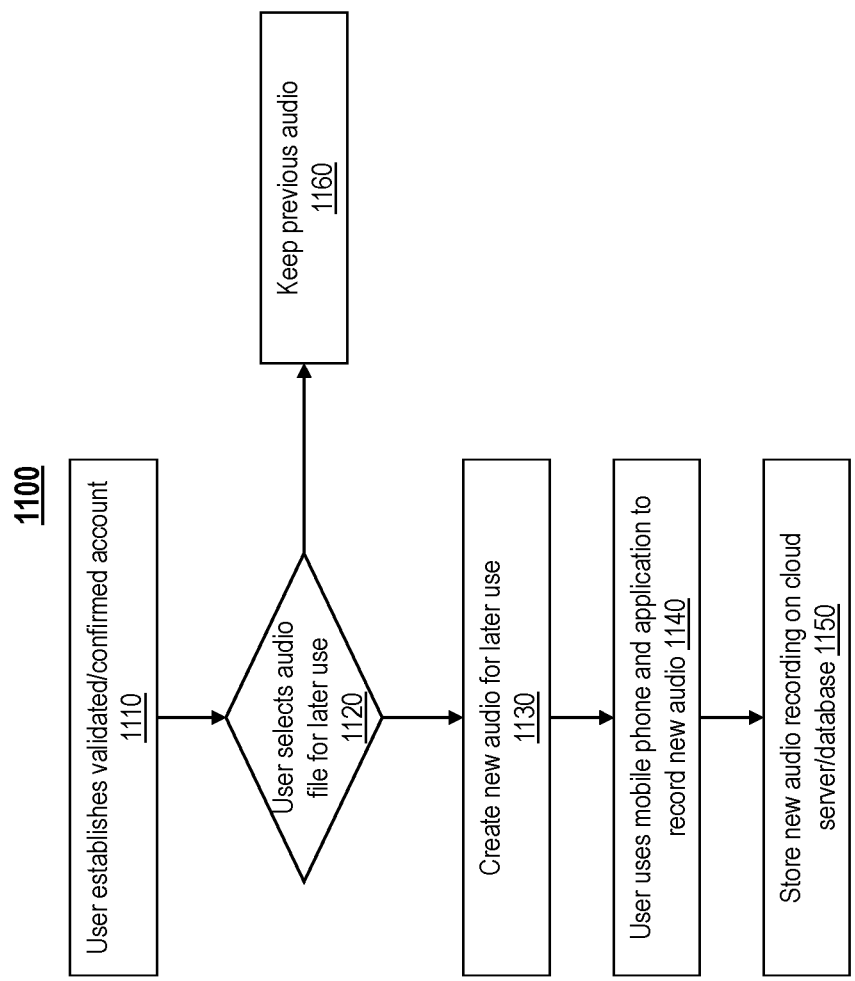
FIG. 11 illustrates an example of a process for allowing a user to select a prerecorded audio file or create a new audio file for a call system to play during a user-triggered call.

FIG. 11 illustrates an example of a process 1100 for allowing a user to select a prerecorded audio file or create a new audio file for a call system to play when a call (generated by the call service) is answered by the user. The process 1100 includes that a user establishes a validated and/or confirmed account (act 1110). The user then selects an audio file for later use (act 1120). In some cases, the user can select to keep a previous audio file (act 1160). Alternatively, the user can create a new audio file for later use (act 1130). In some embodiments, the user can then use a mobile phone (installed thereon a mobile application) to record new audio (act 1140) and stores the recorded new audio file on a cloud server/database (act 1150).

Figure 12:
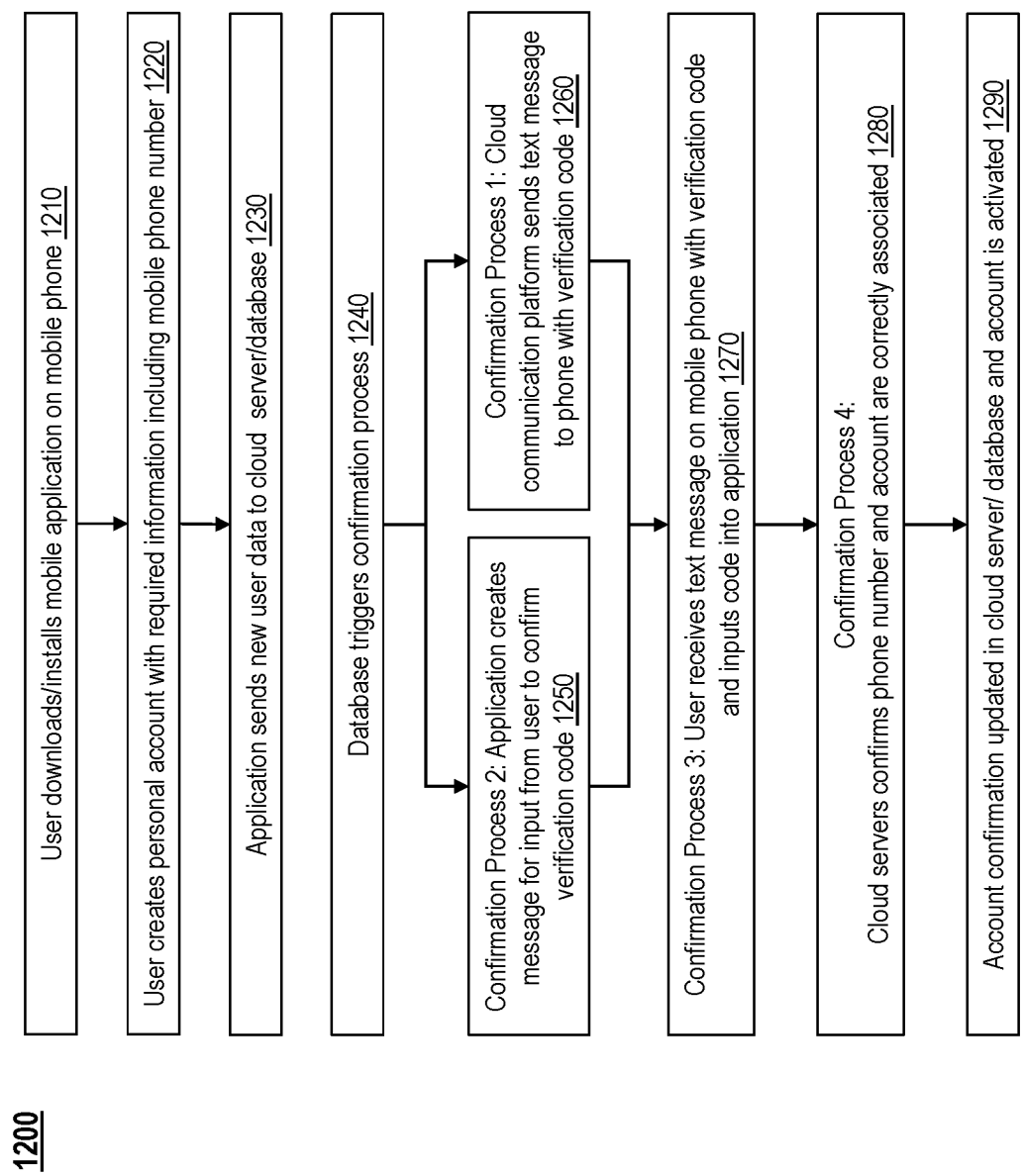
FIG. 12 illustrates an example of a process for installing a mobile application on a mobile phone and registering an account with a call service via the mobile application.

FIG. 12 illustrates an example of a process 1200 for installing a mobile application on a mobile phone and registering an account with a call service via the mobile application. The process 1200 includes that a user downloads and installs a mobile application on a mobile phone (act 1210). The user then creates a personal account with the required information, including a mobile phone number (act 1220). The mobile application then sends the user information to a cloud server and/or database (act 1230). Receiving the user information, the database triggers a confirmation process (act 1240). In some embodiments, the confirmation process includes (1) a cloud communication platform sends a text message to the mobile phone with a verification code (act 1250), and (2) the cloud communication platform causes the mobile application to create a message or a user interface, requiring the user to input the verification code from the user to confirm that the user is the owner of the mobile phone number and/or the mobile phone is associated with the mobile phone number (act 1260). Thereafter, the user receives the text message on the mobile phone with the verification code and inputs the verification code into the mobile application (act 1270). Receiving the verification code input by the user at the mobile application, the cloud server confirms the mobile phone number and associates the mobile phone number with the account (act 1280). Finally, the account is confirmed and activated in the cloud server and/or database (act 1290).

Figure 13:
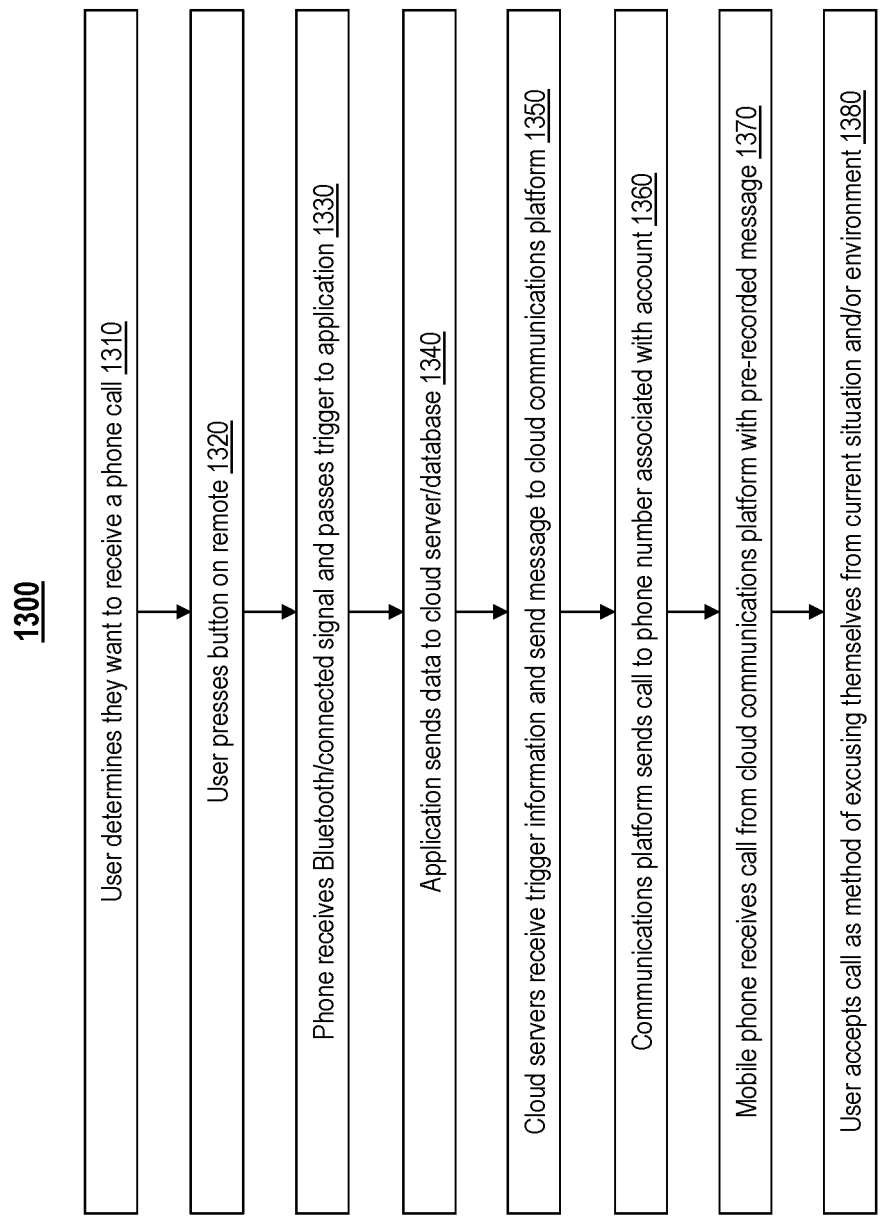
FIG. 13 illustrates an example of a process for triggering a phone call from a call service via an activation device.

FIG. 13 illustrates an example of a process 1300 for triggering a phone call from a call service via an activation device. The process 1300 includes that a user determines that they want to receive a phone call (act 1310) and presses a button on a remote (i.e., the activation device) (act 1320). A mobile phone receives a Bluetooth signal and passes the trigger information to a mobile application (act 1330). The mobile application sends the trigger information to a cloud server/database (act 1340). The cloud server receives the trigger information and sends the trigger to a cloud communications platform (act 1350), which is then triggered to send a call to a phone number associated with an account with the mobile application (act 1360). The mobile phone then receives a call from the cloud communications platform with a prerecorded message (act 1370). The user of the mobile phone can accept the call as a method of excusing themselves from the current situation and/or environment (act 1380).

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may comprise or utilize a special-purpose or general-purpose computer system that comprises computer hardware, such as, for example, one or more processors and system memory, as discussed in greater detail below. Configurations within the scope of the present invention also comprise physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, configurations of the invention can comprise at least two distinctly different kinds of computer-readable media: computer storage media and transmission media.

Computer storage media are physical storage media that store computer-executable instructions and/or data structures. Physical storage media comprise computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can comprise a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be comprised within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be comprised in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may comprise a plurality of constituent computer systems. In a distributed system environment, program modules may be located in both local and remote memory storage devices.

Those skilled in the art will also appreciate that the invention may be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Some configurations, such as a cloud-computing environment, may comprise a system that comprises one or more hosts that are each capable of running one or more virtual machines. During operation, virtual machines emulate an operational computing system, supporting an operating system and perhaps one or more other applications as well. In some configurations, each host comprises a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A mobile phone comprising: one or more processors;
    a first wireless communication interface configured to communicate with an activation device in a personal area network, the activation device comprising:
        a fob comprising:
            a keychain accessory with a quiet button or quiet switch on a front face of the keychain accessory,
            a hole at an upper portion of the keychain accessory, the hole extending through the fob and configured to receive a keychain ring, and
            an internal battery;
    a second wireless communication interface configured to communicate with a call service via a local area network or a wide area network; and
    one or more computer-readable hardware devices having stored thereon computer-executable instructions that are structured such that, when executed by the one or more processors, configure the mobile phone to perform at least:
    after the quiet button or quiet switch mounted on the fob receives a physical input from a user, the computer-executable instructions configure the mobile phone to:
        (1) receive a call request from the activation device via the first wireless communication interface, the call request requesting that a phone call from the call service be made to the mobile phone through the second wireless communication interface;
        (2) pass the call request, from the mobile phone, to the call service via the second wireless communication interface, wherein the call request causes the call service to generate the phone call to the mobile phone using a prerecorded audio file; and
        (3) receive the phone call from the call service, wherein:
            the phone call comprises the prerecorded audio file, and
            the phone call is made to the mobile phone in response to the quiet button or quiet switch mounted on the fob receiving the physical input from the user.

2. The mobile phone of claim 1, the mobile phone further configured to pass the call request to the call service after a predetermined time period.

3. The mobile phone of claim 1, the mobile phone further configured to pair the activation device with the mobile phone, such that when the quiet button or quiet switch mounted on the fob receives the physical input from the user, the mobile phone is configured to receive the call request from the activation device.

4. The mobile phone of claim 1, wherein the mobile phone is further configured to install an application configured to allow the user to login to the call service;
    when the mobile phone receives the call request from the activation device, the mobile phone sends the call request to the call service via the application.

* * * * *